Figure 1:
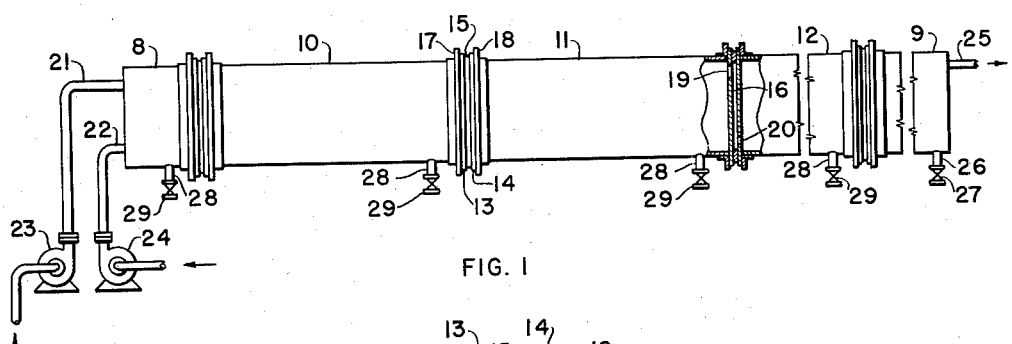

Dec. 20, 1960   C. A. SLEICHER, JR   2,965,695
METHOD AND APPARATUS FOR REPETITIVE MIXING OF FLUIDS
Filed Dec. 3, 1957

INVENTOR:
CHARLES A. SLEICHER, JR.
BY: *Oswald H. Milmore*
HIS ATTORNEY

United States Patent Office 2,965,695
Patented Dec. 20, 1960

2,965,695
METHOD AND APPARATUS FOR REPETITIVE MIXING OF FLUIDS

Charles A. Sleicher, Jr., Berkeley, Calif., assignor to Shell Oil Company, a corporation of Delaware Filed Dec. 3, 1957, Ser. No. 700,421

5 Claims. (Cl. 260—683.75)

The invention relates to the repetitive mixing of a first fluid with a second fluid which is at least partially immiscible therewith so as to cause alternative dispersal of the first fluid in the second and settling of the fluids. More particularly, it relates to a method and apparatus for effecting such repetitive mixing wherein the first fluid flows through an elongated, substantially horizontal conduit containing stratified layers of the second fluid, the superficial velocity of the first fluid through the conduit being greater than that of the second, whereby the second fluid may either flow slowly or intermittently to form a series of pools, agitated at one end and more or less stagnant at the other.

The invention may be applied wherever it is desired to effect repetitive dispersal of the first fluid in the second, as to carry out chemical reactions or effect physical interaction between a liquid or vapor and a heavier liquid which may be either a reactant or a catalyst. Specific examples are the isomerization of hydrocarbons such as butane which is brought into contact with liquid catalyst consisting of $SbCl_3$ and $AlCl_3$ (see U.S. Patent 2,387,868) and the absorption of olefins, such as ethylene and propylene in the vapor phase in sulfuric acid.

It is often desired to effect prolonged contact between two liquids or between a gas and a liquid for exposing fresh surfaces and affording the required contact time. A common expedient is to pass the fluids through a so-called pipeline reactor or contactor having turbulence-producing elements, such as baffles. Desirable features of such devices are that they are simple, economical in cost and operating, afford easy control of heat-transfer, e.g. by the use of heating or cooling jackets, and provide an approximation of slug-type flow, i.e., the residence-time distribution is sharply peaked.

There are, however, two drawbacks to known pipeline reactor for some systems. First, if the two fluids have greatly different densities, stratification and consequent low mass-transfer rates may result. Second, it is sometimes desirable to have a much higher throughput of one fluid than of the other, and this cannot be achieved in conventional horizontal pipeline reactors. These limitations are, to some extent, obviated in vertical pipe reactors, but they are usually expensive and/or impractical if a very long reactor is desired.

It is, therefore, the object of this invention to provide an improved method and apparatus for contacting fluids in a substantially horizontal pipeline, e.g. for effecting a chemical reaction, wherein the aforementioned difficulties are overcome.

A specific object is to provide a method and apparatus for effecting contact between first and second fluids wherein one fluid is driven through a substantially horizontal pipeline containing the second fluid and is repetitively dispersed in and settled from the second fluid while the second fluid flows through the pipeline at a lower rate, which may be continuous or intermittent and may be so low as to be only that required to replenish it.

In summary, according to the invention the substantially horizontal pipeline is provided with a plurality of dispersing units which are spaced apart along the length of the pipeline to subdivide the pipeline into sections within each of which the fluids stratify to form a slowly moving or substantially stagnant layer of the second fluid and a moving layer of the first fluid, and each dispersing unit comprises a pair of spaced, transverse parations which define a chamber therebetween, the partitions having flow passages at different levels so that the passage in the upstream wall is in the settling direction of the first fluid and that in the downstream wall is in the settling direction of the second fluid, the latter passage being restricted.

The first fluid flows from each conduit section which is upstream of a dispersing unit through the passage in the upstream wall, either alone or together with some of the second fluid, and flows through the restricted passage in the downstream wall as a jet into fluid in the adjacent conduit section to form a dispersion; the first fluid settles from this dispersion to form a layer which enters the succeeding dispersing unit.

Either the first or second fluid may have the relatively higher density, and the locations of the passages in the transverse walls are selected according to the rule stated above. The second fluid, which forms the successive pools and moves more slowly, may be passed through the pipeline continuously at a significant flow rate, or it may be supplied intermittently or continuously at a low rate sufficient only to compensate for losses thereof due to entrainment by the first phase or degradation.

Figure 2:
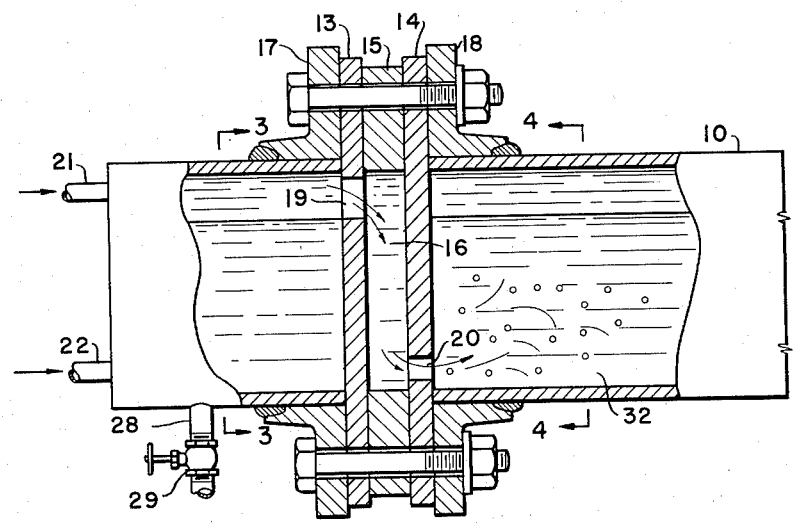
Figure 3:
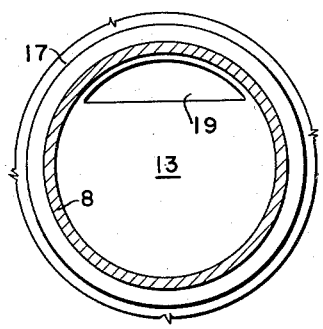
Figure 4:
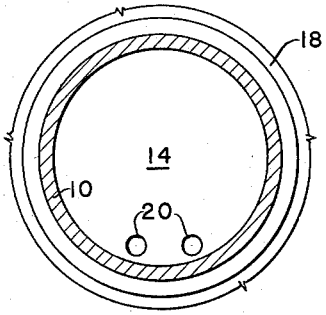

The invention will be further described with reference to the accompanying drawing forming a part of this specification and showing a preferred embodiment, wherein:

Fig. 1 is an elevation view of the apparatus, parts being broken away;

Fig. 2 is an enlarged sectional view of the apparatus, showing one of the dispersing units; and Figs. 3 and 4 are transverse sectional views taken on the lines 3—3 and 4—4, respectively, of Fig. 2.

Referring to the drawing, the contacting apparatus is in the form of a horizontal conduit comprising a pair of end sections 8 and 9 and a plurality of cylindrical sections 10, 11, 12, of suitable lengths, preferably at least several diameters, e.g., two to forty or more diameters. A dispersing unit is provided at the junction of each pair of sections and includes a pair of transverse partition walls 13 and 14 which are spaced apart by a spacer ring 15 to form an intervening chamber 16 and clamped together by bolting flanges 17 and 18 which are welded to the conduit sections. The upstream walls 13 have flow passages 19 displaced from the settling direction of the second fluid (herein assumed to be the fluid of relatively greater density) and are otherwise entirely or substantially imperforate so as to obstruct the flow of the second fluid. As shown in Fig. 3 the passages 19 may be horizontally elongated to form weirs. The downstream wall has one or a plurality of restricted flow passages 20, preferably having a total area less than one-fifth of the cross sectional area of the conduit, displaced from the passage 19 toward the settling direction of the second fluid, i.e., displaced downwardly in the assumed case. It is evident that when the second fluid has a lower density than the first the walls 13 and 14 would be inverted from the positions shown.

The inlet end section 8 has inlet pipes 21 and 22 to which the first and second fluids are supplied under pressure, e.g., by pumps 23 and 24. Similarly, the discharge end section 9 has an outlet pipe 25 for the first fluid and an outlet pipe 26 provided with a valve 27 for the second fluid, both outlets communicating at points displaced vertically in the respective settling directions of the fluids. Each conduit section other than the discharged section is further provided with a drain pipe 28 having a shut-off valve 29.

In operation, as applied for example for isomerizing butane, which forms the first liquid, the second liquid is a catalyst which may consist essentially of about 96% $SbCl_3$ and 4% $AlCl_3$. The latter liquid is admitted first into the conduit through the inlet pipe 22 and forms a series of lower layers in the successive conduit sections by flow through the passages 19 and 20. Admission of the second liquid can then be stopped. Liquid butane is then supplied continuously through the inlet pipe 21. Being of considerably lower density than the second liquid it forms a supernatant layer in the section 8, from which it flows through the passage 19 of the first dispensing unit into the chamber 16. After descending within this chamber it flows out through the restricted passages 20 at high velocity as one or more jets into the layer of second liquid in the adjoining downstream conduit section to form a dispersion 32 and causing strong agitation of the liquid. The liquids are thereby mixed intimately. The first liquid settles upwards and substantially complete disengagement of the phases is achieved by the time the first liquid reaches the end of the conduit section adjoining the next dispersing unit, wherein it enters the dispersing unit and the above-described action is repeated. The discharge section 9 functions also as a settler, from which the isomerized butane is discharged from the top via the outlet pipe 25.

The second liquid is admitted during the operation to replenish liquid catalyst which is entrained with the discharged butane. Moreover, because the catalyst is gradually degraded it is desirable to renew it. To this end the valve 27 is opened continuously or intermittently and fresh catalyst is admitted through the inlet pipe 22. This fresh liquid rises within each conduit section only to the level of the passages 19 and any excess flows together with the butane into the chamber 16 of the adjoining downstream disperser and carried by the butane which flows through the passages 20. It is further possible to admit the catalyst and discharge it otherwise. Thus, spent catalyst can be discharged through one or more of the pipes 28 in addition to or instead of discharge through the pipe 26 to permit additional replenishment in the conduit sections upstream from the discharge section 9. Similarly, the catalyst can be admitted through one or more of the pipes 28.

It is evident that the liquid level is thus automatically maintained within each conduit section and that the flow rate of the two fluids can be controlled independently.

When used in a process wherein the second liquid is or contains the product, e.g., when it consists of sulfuric acid in which a hydrocarbon is absorbed, it is flowed through the pipe continuously.

I claim as my invention:

1. Method of contacting a first fluid with a second fluid of different density which is substantially immiscible therewith, which method comprises the steps of: maintaining a series of layers of the second fluid within a corresponding series of separate, confined, horizontally elongated contacting zones situated at a substantially common level and separated by confined intervening zones, flowing the first fluid successively through the layers of second fluid, forming a dispersion of first liquid within each said layer of second fluid, and settling the dispersed first fluid within the respective contacting zones to form layers of settled first fluid by admitting first fluid continuously and under pressure as a submerged jet into the second fluid layer within the first contacting zone of the series at the upstream end thereof at a velocity high enough to disperse said first fluid in the second fluid, discharging first fluid in the settled layer from the downstream end of each contacting zone, flowing first fluid discharged from each zone except the last through the adjoining intervening zone with a vertical flow component to the level of second fluid in the succeeding contacting zone, and admitting first fluid from each said intervening zone as a submerged jet into the second-fluid layer of the succeeding contacting zone at the upstream end thereof at a velocity high enough to disperse said first fluid in the second fluid, said jets and dispersions being effected solely by the pressure at which said first fluid is admitted into said first contacting zone.

2. Method according to claim 1 which includes the steps of admitting second fluid continuously into a layer thereof in a contacting zone other than the last in the series at a flow rate which is less than that of the first fluid, transporting a portion of the second fluid from said contacting zone by entrainment with first fluid discharged therefrom through the succeeding intervening zone and into the subsequent contacting zone, and discharging second fluid from the last-mentioned zone.

3. Apparatus for the repetitive mixing of a stream of first fluid with a second fluid of different density which is substantially immiscible with the first fluid which apparatus comprises: a substantially horizontal, elongated conduit having inlet means for said fluids including means for admitting at least the first fluid continuously under pressure at one end thereof, and outlet means for discharging contacted first fluid at the other end; and, situated between said ends, at least two dispersing units spaced apart by a distance at least twice the diameter of the conduit and dividing the conduit into combined dispersal and settling sections, so that a stratified layer of each of said fluids can be formed within each section by settling, each dispersing unit including a pair of spaced walls extending transversely to the conduit and defining therebetween an intervening chamber, the upstream wall of each pair being substantially imperforate adjacent all of the layer of second fluid in the adjoining upstream section and having a flow passage for first fluid situated adjacent the layer of first fluid in said adjoining upstream section and the downstream wall of each pair being substantially imperforate throughout the level of the open region of the upstream wall and having, at the letvel of the adjacent layer of second fluid in the adjoining downstream section, orifice means directed horizontally into said last-mentioned layer and of restricted cross sectional area such as to form a jet of first fluid flowing from the said intervening chamber solely under pressure of admission thereof to the upstream end of the conduit having a velocity high enough to disperse said first fluid in the second fluid, whereby said first fluid is forced by said pressure successively into each intervening chamber, through said chambers with vertical flow component toward the settling direction of the second fluid, dispersed by said orifice means into each of the adjacent downstream layers of second fluid.

4. Apparatus according to claim 3 wherein a plurality of said dispersal and settling sections are provided with individual flow means for second fluid, said flow means being in communication with the respective sections at a level toward the settling direction of the second fluid.

5. Apparatus according to claim 3 wherein each of said downstream walls contains a plurality of restricted orifices for dispersing first fluid into the adjoining downstream layer of second fluid by a plurality of separate, high-velocity jets.

References Cited in the file of this patent

UNITED STATES PATENTS

| | | |
|---|---|---|
| 822,373 | Knietsch | June 5, 1906 |
| 1,394,780 | Nicholas | Oct. 25, 1921 |
| 2,221,093 | Hillman et al. | Nov. 12, 1940 |
| 2,266,521 | Van Dijck | Dec. 16, 1941 |
| 2,629,654 | Olney | Feb. 24, 1953 |
| 2,720,447 | Jones et al. | Oct. 11, 1955 |

OTHER REFERENCES

Stiles: "Petroleum Refiner," volume 34, Number 2, pages 103–106, February 1955.